United States Patent [19]

Fedeli

[11] 4,429,518
[45] Feb. 7, 1984

[54] BLADE STRUCTURE, PARTICULARLY FOR ROTATING GRASS SHAVING MACHINES

[76] Inventor: Luisa Fedeli, Via del Gracchi, 26, 20100 Milano, Italy

[21] Appl. No.: 476,397

[22] Filed: Mar. 18, 1983

Related U.S. Application Data

[63] Continuation of Ser. No. 334,369, Dec. 24, 1981, abandoned.

[30] Foreign Application Priority Data

Jan. 14, 1981 [IT] Italy ................ 19124 A/81

[51] Int. Cl.³ .......................................... A01D 55/18
[52] U.S. Cl. .................................................. 56/295
[58] Field of Search ....................................... 56/295

[56] References Cited

U.S. PATENT DOCUMENTS 3,538,692 11/1970 Cope et al. .................... 56/295
3,703,071 11/1972 Anderson ....................... 56/295

Primary Examiner—Jay N. Eskovitz
Attorney, Agent, or Firm—Bucknam and Archer

[57] ABSTRACT

The novel lawn mower has a blade which comprises an elongated body, capable of rotating about a substantially perpendicular axis to the ground, provided, at the operative edges thereof, with cutting members for cutting grass and, at the opposite edges with respect to said cutting members, with unsharpened lugs capable of directing the cut grass into the collection container and chopping the cut grass, immediately after the grass has been cut.

5 Claims, 7 Drawing Figures

BLADE STRUCTURE, PARTICULARLY FOR ROTATING GRASS SHAVING MACHINES

This application is a continuation-in-part of U.S. Ser. No. 334,369 filed Dec. 24, 1981 and now abandoned.

The present invention relates to a lawn mower comprising a novel blade structure, particularly rotating grass cutting or shaving lawn mowers.

It is known that the presently available grass cutting or shaving machines practically consist of rotating motorized machines, provided with one or more blades which are rotated around an axis substantially perpendicular to the ground, in order to evenly cut the grass.

These machines generally comprise a cutting assembly, driven by any suitable means, to which a containing assembly is usually associated, capable of receiving the cut grass. More specifically, in the known grass cutting or shaving machines, the cut grass is collected by projecting the cut grass into a container which may be located either laterally or at the rear with respect to the body or frame of the shaving machine.

In order to facilitate and improve the projection of the cut grass, in the known grass shaving machines, the end or ends of the cutting blade or blades are shaped by using solid or perforated blade elements, in such a manner as to provide a continuous pushing force on the freshly cut grass towards the collection container.

In these cases, the cut grass is immediately projected and reaches the container in rather long pieces which substantially correspond to the length of the pieces of cut grass. Clearly, this fact does not favor and even hinders a full and rational filling of the container, since unavoidably it creates in the interior of the container empty spaces. During the grass cutting operations, the operator, therefore, must frequently interrupt his work, to empty the container, a fact which increases the time required to complete the operation.

Accordingly, the object of the present invention is to eliminate the above-mentioned drawback by providing the lawn mower, particularly lawn mowers of the rotating type with a blade which is capable of achieving improved filling of the cut grass container, so as to reduce the emptying operations during the grass cutting work.

More specifically, the object of the present invention is to provide a blade structure capable of improving the grass shaving or cutting machine efficiency and improving the quality of the cutting operation.

Still another object of the present invention is to provide a blade structure, particularly for rotating grass shaving machines capable of assuring great safety and reliability.

Still another object of the present invention is to provide a blade structure which is constructionally very simple, does not require a great deal of maintenance and is of reduced cost.

The mentioned objects, as well as other objects which will become more apparent hereinbelow, are achieved by a blade structure, particularly for rotating grass shaving machines, comprising an elongated body, rotating about an axis substantially perpendicular to the ground and provided, at the operative edges thereof, with cutting members for cutting grass, and at the edges opposite to said operative edges, lugs capable of projecting the grass into the collection container.

The crux of the present invention resides in providing a blade with lugs, the edges of which are not sharpened, which lugs, during the cutting operation, throw the pieces of cut grass into the collection container. Although the lugs may also further chop the cut grass, this function is secondary, is not essential and does not necessarily occur because the lugs are not sharpened.

Further characteristics and advantages of the invention will become more apparent from the following description of a few embodiments of a blade structure, particularly for rotating grass shaving or cutting machines, being illustrated by way of nonlimitative examples in the accompanying drawings, of which:

With reference to the numbers of the aforesaid figures, the blade structure, particularly for rotating grass shaving machines, indicated by reference number 1, comprises an elongated body 2 capable of rotating about an axis substantially perpendicular to the ground, for coupling with a suitable driving shaft.

At the operative edges, the blade 1 is provided with a cutting profile 3, for cutting grass, as the blade is rotated.

The main feature of the present invention is that, at the edges opposite to those provided with the cutting profile 3, there are provided lugs, capable of throwing and projecting the cut grass into the grass container.

In the practice, the inventive idea consists of the provision of the lugs, the geometrical shape of which facilitates the projection of the cut grass off the cut shaving machine casing and into the cut grass container and which also may chop the cut grass.

Thus, it is possible to fill the container with a greater amount of grass so as to improve the grass shaving machine efficiency and to reduce substantially the number of the container emptying operations, during the cutting steps.

On the basis of many experiments, applicant has ascertained that the most satisfactory shape of the lugs consists of members provided with vertically extending portions, that is perpendicular to the blade rotation plane, meeting with horizontally extending portions, that is parallel to the plane of said blade.

Figure 1:
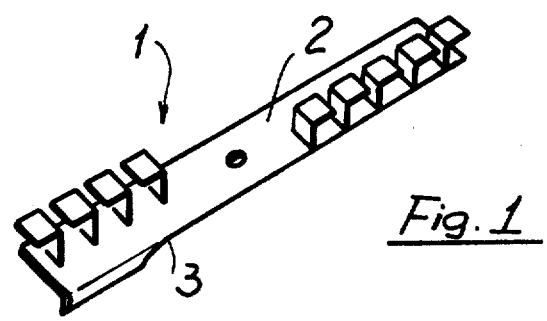
FIG. 1 is a schematic perspective view illustrating the blade structure according to the invention.
Figure 2:
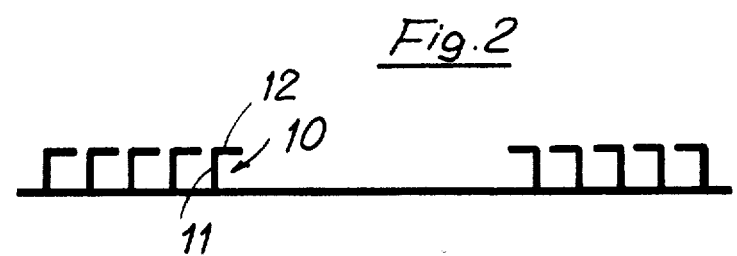
FIG. 2 illustrates a blade, provided with reversed L-shaped lugs, facing towards the center.

With specific reference to FIG. 2, the lugs, indicated at 10 are of reversed L-shape, having a vertically extending stem 11, perpendicularly extending with respect to the blade plane, at the end of which there extends a horizontal portion or leg 12 facing the rotation center of the blade.

Figure 3:
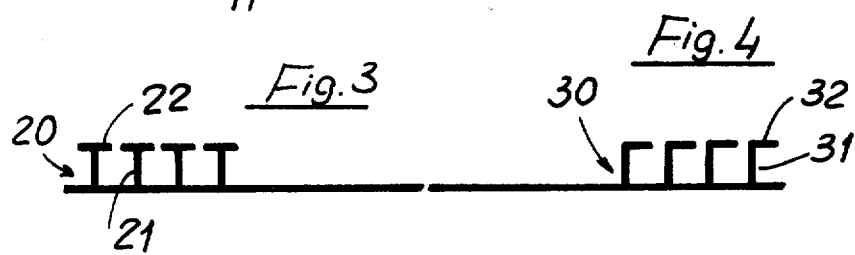
FIG. 3 illustrates a blade provided with T-shaped lugs.

As shown in FIG. 3, the lugs, indicated at 20 are T-shaped and provided with a stem or vertical leg 21 from the free end of which there extends a horizontal leg 22.

Figure 4:
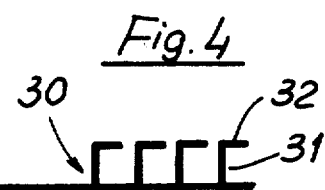
FIG. 4 illustrates a blade provided with C-shaped lugs.

In the embodiment illustrated in FIG. 4, the lugs, indicated at 50, are of C-shape, horizontally extending, with the central portion 51 associated with the elongated body 2 and vertical portions 52 from the free ends of which there extend horizontal portions 53 facing one another.

Thus, from the above description, it should be evident that the optimum shape of the lugs consists of a particular combination of perpendicular portions or legs and portions parallel to the blade rotation plane, which portions are capable of chopping the cut grass at the time when the cut grass is still suspended behind the casing of the grass cutting machine, but even more significant, they are capable of projecting and pushing the chopped grass into the cut grass container.

The thus shaped lugs may be directly formed on the body 2 by means of shearing and bending, or they can be applied subsequently to the elongated body 2 of the blade 1.

The shape of the lugs may be so designed as to facilitate the engagement of the blade with spring members, capable of removing from the grass ground dessicated material which usually is not removed by the rotating blade and which is deleterious for the growth of grass.

Figure 5:
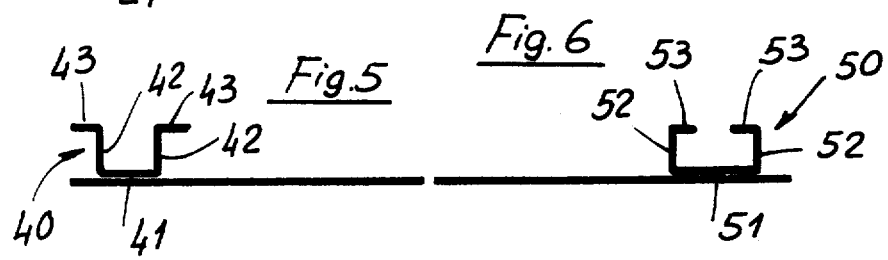
FIGS. 5 and 6 show blades provided only with three and two lugs respectively.
Figure 6:
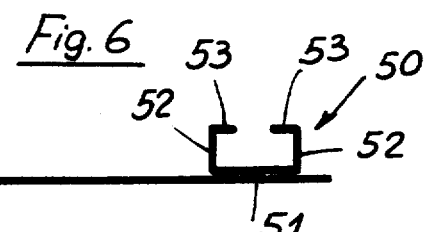
Figure 7:
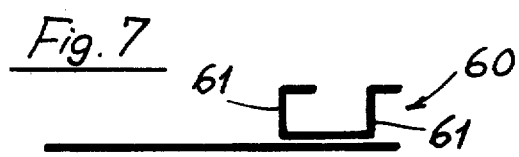

It has also been found that three and even only two lugs as shown in FIGS. 5 and 6, are not only adequate to project the cut grass into the container but are more effective and preferable to four or five lugs. This fact, on one hand, permits to reduce the cost of manufacture and, on the other hand, improves the pushing and projecting of the cut grass into the container.

From the above description, it is possible to note that the present invention fully achieves its objects.

In particular, it should be pointed out that the provision of said lugs is capable of chopping the cut grass and projecting the cut grass into the collecting container.

Thus, it is possible to improve the filling of the container with the consequent advantage of remarkably increasing the volume of grass which may be contained in said container.

The invention, as it has been disclosed, is susceptible to several modifications and variations, all falling within the scope of the inventive idea.

Moreover, all of the details can be replaced by other technically equivalent elements.

It is also preferable to provide lugs in which the vertical portion is of substantially greater length than the horizontal portion.

What is claimed is:

1. In a lawn mower which comprises a blade structure comprising an elongated body, rotating about an axis substantially perpendicular to the ground and provided, at the operative edges thereof, with cutting members for cutting grass, a container for collecting the cut grass, and at the edges opposite to said operative edges, a plurality of lugs, the improvement wherein said lugs consist of a combination assembly of first parallel, vertically extending, unsharpened portions extending perpendicularly to the plane of rotation of the blade and coplanar, horizontally extending portions connected to said first portions extending parallely to the plane of rotation of said blade and coplanar with respect to each other, said lugs directing the chopped grass into said container.

2. The lawn mower according to claim 1, wherein said lugs are substantially inverted L-shaped, with a long leg perpendicularly extending with respect to said blade rotation plane and a short leg, connected to the end of said long leg and facing the rotation center of said blade.

3. The lawn mower according to claim 1, wherein said lugs are of substantially T-shape.

4. The lawn mower according to claim 1, wherein said lugs are of substantially C-shape comprising a central member parallel to the plane of the blade, a pair of vertically extending portions connected to the ends of said central member and a pair of horizontal portions connected to the ends of said vertically extending portions.

5. The lawn mower according to claim 1, wherein two or three lugs are provided at the edges opposite to said operative edges, on each side.

* * * * *